June 21, 1960 P. B. EDWARDS ET AL 2,942,181
APPARATUS FOR TESTING CABLE
Filed June 4, 1957
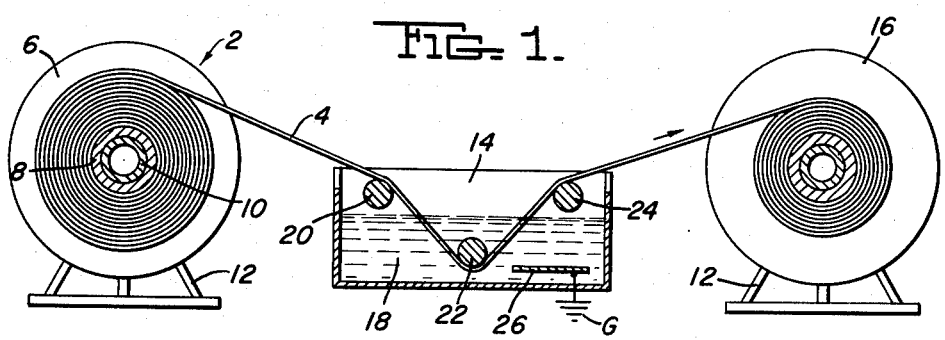
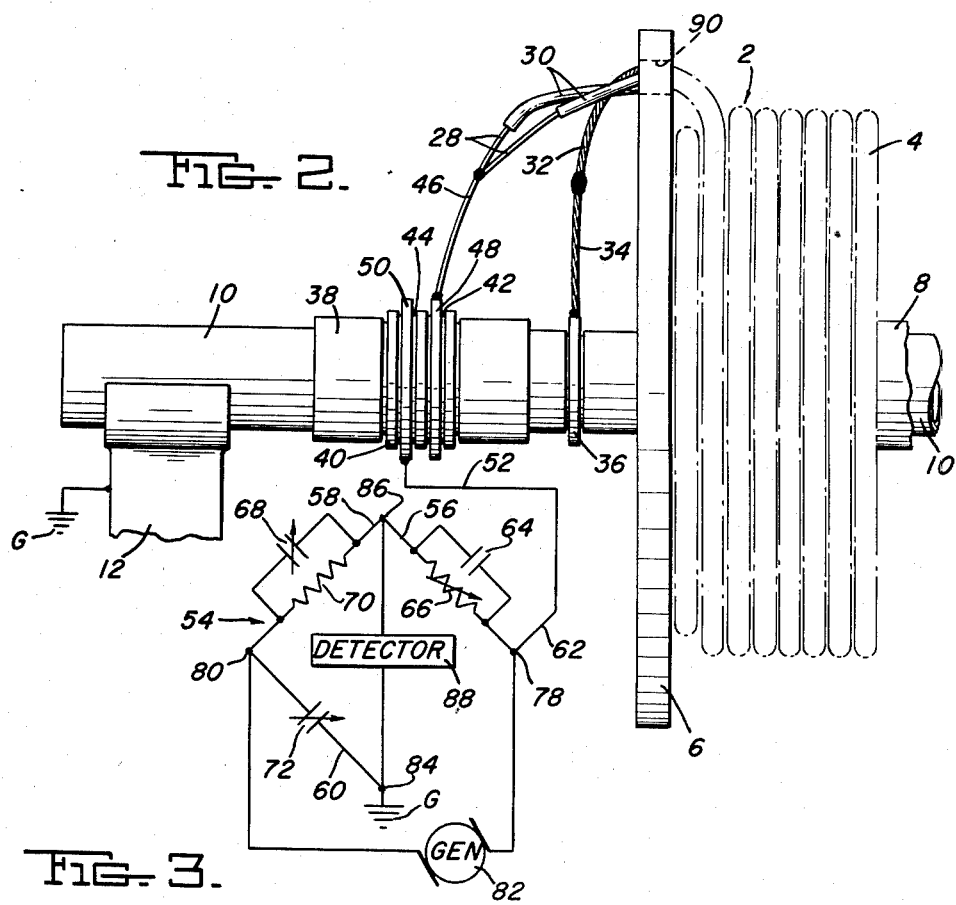
INVENTORS
PAUL B. EDWARDS and
STANLEY H. LINDEN
By: Donald G. Dalton
Attorney

United States Patent Office 2,942,181
Patented June 21, 1960

2,942,181
APPARATUS FOR TESTING CABLE

Paul B. Edwards, Sutton, and Stanley H. Linden, Worcester, Mass., assignors to United States Steel Corporation, a corporation of New Jersey Filed June 4, 1957, Ser. No. 663,529

3 Claims. (Cl. 324—54)

This invention relates to apparatus for testing cable and is a continuation-in-part of our copending application Serial No. 537,156, filed September 28, 1955, now abandoned. The invention is particularly suitable for locating faults in service drop cables or other cables which are provided with one or more insulated conductors and one or more uninsulated conductors which do not completely surround the insulated conductors. Prior to our invention we did not know of any suitable method or apparatus for locating faults in such cables. Those methods and apparatus for testing cables of which we have knowledge either cannot determine whether or not there is a fault in the cable or if they do determine the fault they cannot locate its position.

It is therefore an object of our invention to provide inexpensive apparatus for testing and locating faults in cables having an insulated conductor and an uninsulated conductor therein which does not surround the insulated conductor.

This and other objects will be more apparent after referring to the following specification and attached drawings, in which:

Figure 1 is a schematic elevational view, partly in section, of the apparatus used in our invention;

Figure 2 is an enlarged detailed view of part of the apparatus shown in Figure 1 and including a schematic wiring diagram; and Figure 3 is a view of a cable of the type to be tested.

Referring more particularly to the drawings, reference numeral 2 indicates a pay-off reel for supporting the cable 4. Pay-off reel 2 is of the usual type having side flanges 6 and a central tubular support 8 extending therebetween. A tubular shaft 10 is supported on brackets 12 at each side of the reel 2 and passes through the tubular support 8. From the reel 2 cable 4 passes through a container 14 to a take-up reel 16 which is similar in construction to the reel 2. The container 14 contains a liquid conductor which is preferably a solution 18 of water, salt and a wetting agent. In the tank or container 14 the cable 4 passes over a roll 20 downwardly into the solution 18 beneath the sink roll 22 and then from the tank 14 over a roll 24. Tank 14 contains a copper plate 26 which is connected to ground G. The cable 4 shown includes two conductors 28 each surrounded by insulation 30 and stranded around an uninsulated conductor 32. The uninsulated conductor 32 is connected by means of wire 34 to a slip ring 36 mounted on shaft 10. The shaft 10 and support 12 are made of steel or other electrically conducting material and the support 12 is connected to ground G so that the conductor 32 is connected to ground G. A tube 38 made of electrically insulating material surrounds the shaft 10 and supports a copper ring 40 having grooves 42 and 44 therein. The conductors 28 are connected by means of wire 46 to a slip ring 48 mounted in groove 42. A slip ring 50 mounted in groove 44 is connected by means of wire 52 into a bridge circuit 54. The bridge shown is a Schering type capacitance bridge and includes four arms 56, 58, 60 and 62. The arm 56 includes a fixed condenser 64 connected in parallel with a variable resistor 66. Arm 58 has a variable condenser 68 connected in parallel with a resistor 70. The arm 60 has a variable condenser 72 connected therein. The arm 62 includes the conductors 28 and 32, solution 18 and ground G connected in the bridge circuit as shown. High frequency current is applied to the bridge circuit at points 78 and 80 by means of an oscillator type generator 82. The junction 84 between arms 60 and 62 is connected to ground G. Junctions 84 and 86 of the bridge are connected to a detector 88. The detector 88 may be of various types, such as galvanometer, but is preferably of a type which gives an audible signal.

The operation of our device is as follows:

One end of the cable 4 is threaded through the tank 14 to the reel 16 and the other end of the cable is passed through a hole 90 in flange 6 and the conductors 28 and 32 are connected to slip rings 48 and 50, respectively. The bridge circuit 54 is then balanced by means of variable condensers 68 and 72 and variable resistor 66 so that a minimum signal or no signal appears on detector 88. In this arrangement the insulated conductors 28 form one plate of a condenser, the uninsulated conductor 32, solution 18 and the ground form the other plate and the insulation 30 forms the dielectric. The reel 16 is then rotated in any suitable manner to pull the cable 4 through the solution 18. As long as the cable is not defective the minimum signal or no signal appears on the detector 88. When a fault 92 enters the solution 18 a short occurs between conductors 28 and 32, thus causing detector 88 to give a signal. The operator then stops movement of the cable 4 and marks the defective part of the cable.

While one embodiment of our invention has been shown and described it will be apparent that other adaptations and modifications may be made without departing from the scope of the following claims.

We claim:

1. Apparatus for testing and locating a fault in a cable having at least one insulated conductor and an uninsulated conductor which comprises a pay-off reel for supporting the cable, a container, a water solution in said container, a take-up reel, means for passing the cable from said pay-off reel through said water solution to said take-up reel, means for grounding the water in said container, a bridge circuit, said conductors comprising a first arm of said bridge, means for connecting the junction between the first and second arms of said bridge to ground, means for grounding an end of said uninsulated conductor, a connection between said junction and the juncton between the third and fourth arms of said bridge, a detector in said last named connection operable when a fault occurs in said cable, a power source, and means for connecting said power source to said bridge circuit.

2. Apparatus for testing and locating a fault in a cable having at least one insulated conductor and an uninsulated conductor which comprises a pay-off reel for supporting the cable, a shaft of conducting material for supporting the reel, means for grounding said shaft, a slip ring on said shaft connected to an end of said uninsulated conductor, a container, a water solution in said container, a take-up reel, means for passing the cable from said pay-off reel through said water solution to said take-up reel, means for grounding the water in said container, an insulating ring on said shaft, a ring of conducting material on said insulating ring, a slip on said insulating ring electrically connected to said insulated conductor, a detector, means electrically connecting said detector to ground, means electrically connecting said detector to said last named slip ring, a power source, and means for connecting said power source to said insulated conductor.

3. Apparatus for testing and locating a fault in a cable having at least one insulated conductor and an uninsulated conductor which comprises a pay-off reel for supporting the cable, a shaft of conducting material for supporting the reel, means for grounding said shaft, a slip ring on said shaft connected to an end of said uninsulated conductor, a container, a water solution in said container, a take-up reel, means for passing the cable from said pay-off reel through said water solution to said take-up reel, means for grounding the water in said container, an insulating ring on said shaft, a ring of conducting material on said insulating ring, a slip ring on said insulating ring electrically connected to said insulated conductor, a bridge circuit, said conductors comprising a first arm of said bridge, means for connecting the junction between the first and second arms of said bridge to ground, a second slip ring on said insulating ring, a lead connecting said second slip ring between the first and third arms of said bridge, a connection between said junction and the junction between the third and fourth arms of said bridge, a detector in said last named connection operable when a fault occurs in said cable, a power source, and means for connecting said power source to said bridge circuit.

References Cited in the file of this patent

UNITED STATES PATENTS

| | | |
|---|---|---|
| 2,401,398 | Wright | June 4, 1946 |
| 2,522,151 | Weeks | Sept. 12, 1950 |
| 2,751,565 | Johnston | June 19, 1956 |
| 2,752,590 | Towle | June 26, 1956 |
| 2,765,441 | Gambrill | Oct. 2, 1956 |